United States Patent [19]  [11] 3,909,480
Ogata et al.  [45] Sept. 30, 1975

[54] EPOXY RESIN COMPOSITIONS CONTAINING TETRAPHENYLBORATES OF IMIDAZOLES

[75] Inventors: Masatzugu Ogata, Hitachi; Ritsuro Tada, Mito; Motoyo Wajima, Hitachi; Masahiro Kitamura, Hitachi; Hiroshi Suzuki, Hitachi; Mikio Sato, Hitachi; Etuzi Kubo, Shimodate, all of Japan

[73] Assignees: Hitachi, Ltd.; Hitachi Chemical Company, Ltd., Japan

[22] Filed: Mar. 27, 1974

[21] Appl. No.: 455,403

[52] U.S. Cl. ........ 260/37 EP; 260/2 EP; 260/18 EP; 260/23 EP; 260/47 EN; 260/51 EP
[51] Int. Cl.² .......................................... C08L 63/00
[58] Field of Search ....... 260/37 EP, 47 EN, 47 EC, 260/2 N, 309

[56] References Cited
UNITED STATES PATENTS
3,678,007  7/1972  Dowbenko et al. ............. 260/2 N X
3,793,247  2/1974  Fleming et al. ................. 260/2 N X Primary Examiner—Lewis T. Jacobs
Attorney, Agent, or Firm—Craig & Antonelli

[57] ABSTRACT

This invention provides an epoxy resin composition excellent in curability and storage stability (shelf life or potting life) and capable of yielding a cured product excellent in various characteristics, comprising an epoxy resin and a tetra-substituted borate of imidazoles incorporated therein, and also provides a method for manufacturing said composition.

17 Claims, No Drawings

EPOXY RESIN COMPOSITIONS CONTAINING TETRAPHENYLBORATES OF IMIDAZOLES

Epoxy resins are preferred for such rather diversified uses as casting, molding, laminating, impregnating, adhering, and coating. The methods for curing epoxy resins can be broadly classified into the following three: The first method uses mainly acid anhydride curing agents, the second method uses amine-type curing agents, and the third method uses such curing agents as boron trifluoride-amine complexes and imidazoles. These methods, however, have the following disadvantages: In the first method which utilizes acid anhydride curing agents, since heating at a considerably elevated temperature for a considerably long period of time is necessary in curing, a curing catalyst, such as tertiary amine or a quaternary ammonium salt is added in order to shorten the curing time. The addition of such a curing catalyst has a disadvantage of causing a marked decrease in storage stability of the resulting epoxy resin composition. On the other hand, although the second method utilizing amine-type curing agents has an advantage of easily yeilding a cured product superior in moisture resistance, chemical resistance, electrical and mechanical properties to that obtained with acid anhydride curing agents, it has a disadvantage in that owing to low reactivity of the amine-type curing agent used in an epoxy resin composition of desirable storage stability, the curing agent is generally used together with a curing catalyst such as, for example, a modified amine, a boron trifluoride-amine complex, phenol, chlorophenol, bisphenol-A, resorcinol, phenol resin, salicylic acid, metal salts of salicylic acid, and triphenyl phosphite. However, the addition of the curing catalyst results, as mentioned above, in a marked reduction in shelf life or potting life at around room temperature, an insufficient cure-promoting effect, or a deterioration in moisture resistance, chemical resistance, and electrical and mechanical properties. In short, among conventional acid anhydrides and amine compounds, there are no compounds capable of statisfying all of the requirements for curability, and storage stability of the epoxy resin composition and for various characteristics of the cured product. When a certain boron trifluoride-amine complex is used as the curing agent, it has already been known that an epoxy resin composition having a good storage stability is obtained, whereas the moisture resistance is yet to be improved.

An object of this invention is to provide an epoxy resin composition excellent in so-called latent curability, that is, having a good storage stability without gelling at room temperature or thereabout, and rapidly curing on heating.

Another object of this invention is to provide an epoxy resin composition which yields on curing a cured product excellent in electrical, mechanical and other characteristics, particularly in moisture resistance and chemical resistance.

A further object of this invention is to provide an epoxy resin composition suitable as a material for use in casting, laminating, impregnating, adhering, coating, and molding.

A still further object of this invention is to provide an epoxy resin composition suitable for electrical insulation, particularly for encapsulating a semiconductor device and also suitable as a prepreg for use in laminated resin sheet and in adhering.

A still further object of this invention is to provide an epoxy resin composition susceptible to wet mixing (mixing in the softened or molten state).

A still further object of this invention is to provide a method for manufacturing an epoxy resin composition, whereby simplification of the working and enhancement in productivity can be achieved.

Other objects and advantages of the invention will become apparent from the following description.

The epoxy resin composition of this invention is characterized in that it consists essentially of (a) 100 parts by weight of an epoxy resin having at least two vicinal epoxy groups and (b) 0.01 to 30 parts by weight of at least one organoboron compound selected from the group consisting of tetra-substituted borates of imidazole and tetra-substituted borates of imidazole derivatives obtained by reacting alkali metal salts of tetra-substituted boron compounds with at least one member selected from the group consisting of salts of imidazole and salts of imidazole derivatives formed by reacting acids with imidazole and imidazole derivatives represented by the general formula:

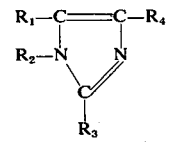

wherein $R_1$, $R_2$, $R_3$, and $R_4$, which may be the same as or different from one another, are selected from the group consisting of hydrogen, alkyl groups having 1 to 20 carbon atoms, alkenyl groups having 2 to 6 carbon atoms, acyl group having 2 to 7 carbon atoms, aryl groups having 6 to 12 carbon atoms, cycloalkyl groups having 6 to 12 carbon atoms, cycloalkenyl groups having 6 to 12 carbon atoms, aldehyde group, carboxyl group, cyano group, and nitro group.

The most characteristic feature of this invention consists in that at least one organoboron compound selected from the group consisting of the tetra-substituted borates of imidazole and its derivatives (these salts are hereinafter referred to simply as ITPB) represented by the general formula (1)

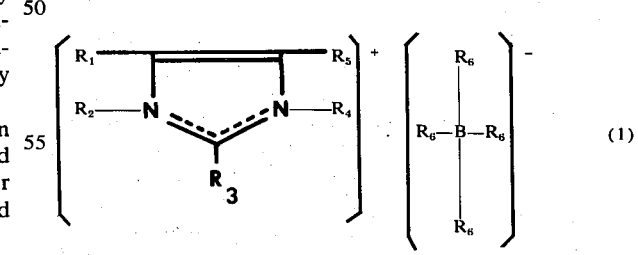

wherein $R_1$, $R_2$, $R_3$, $R_4$, and $R_5$ are independently hydrogen atoms, alkyl groups having 1 to 20 carbon atoms, alkenyl groups having 2 to 6 carbon atoms, acyl groups having 2 to 7 carbon atoms, aryl groups having 6 to 12 carbon atoms, cycloalkyl groups having 6 to 12 carbon atoms, cycloalkenyl groups having 6 to 12 carbon atoms, aldehyde groups, carboxyl groups, cyano groups, or nitro groups (said $R_1$, $R_2$, $R_3$, $R_4$, and $R_5$ may be the same as or different from one another), and $R_6$ is a phenyl group or a substituted phenyl group. The general formula (1), however, is not yet established but only presumed.

The method of preparing the said ITPB has no particular limitation. An example of the preparative procedure is given below.

ITPB is obtained by reaction of two starting components, that is, a salt of an imidazole of the formula (2)

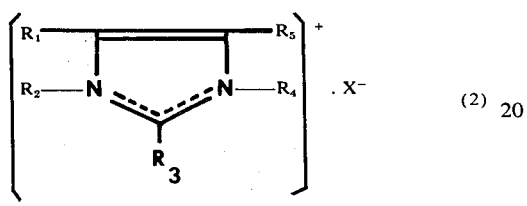

wherein $R_1$, $R_2$, $R_3$, $R_4$, and $R_5$ are the same as defined above, and $X^-$ is an anion such as chloride ion, bromide ion, iodide ion, sulfate ion, nitrate ion, or acetate ion, and a tetra-substituted borate of the formula (3)

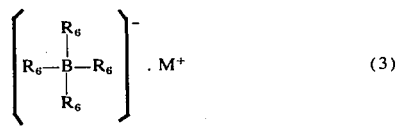

wherein $M^+$ is an alkali metal ion such as lithium ion, sodium ion, or potassium ion, and $R_6$ is the same as defined in the formula (2).

The salts of imidazoles can be prepared by reacting an imidazole such as, for example, imidazole, 2-methylimidazole, 2-undecylimidazole, 2-heptadecylimidazole, 2-phenylimidazole, 2-ethyl-4-methylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, and 1-cyanoethyl-2-phenylimidazole, with at least one acid selected from the group consisting of inorganic acids such as hydrochloric acid, sulfuric acid, and nitric acid; organic acids such as acetic acid, oxalic acid, and succinic acid; acidic aromatic nitro compounds such as picric acid and picrolonic acid; and alkyl halides, in water or in an organic solvent such as an alcohol, at room temperature or elevated temperatures. The intended ITPB is obtained by reacting a salt of an imidazole and an alkali metal salt of tetra-substituted boron in water or in an organic solvent such as an alcohol, at room temperature or elevated temperatures. Examples of useful ITPB include imidazolium tetraphenylborate, methylimidazolium tetraphenylborate, 2-ethyl-4-methylimidazolium tetraphenylborate, 2-ethyl-1,4-dimethylimidazolium tetraphenylborate, 1-cyanoethyl-2-ethyl-4-methylimidazolium tetraphenylborate, 1-cyanoethyl-2-undecylimidazolium tetraphenylborate, 1-cyanoethyl-2-phenylimidazolium tetraphenylborate, 1-vinyl-2-methylimidazolium tetraphenylborate, 1-vinyl-2,4-dimethylimidazolium tetraphenylborate, 1-β-hydroxy-ethyl-2-methyl-imidazolium tetraphenylborate, 1-allyl-2-methylimidazolium tetraphenylborate, 1-allyl-2-phenylimidazolium tetraphenylborate, and 1-allyl-2-undecylimidazolium tetraphenylborate. These compounds may be used alone or in admixture of two or more.

Preperation Examples of ITPB are shown below, but the invention is not limited to the Examples, and, for example, reaction conditions and others may be modified at will.

Preparation Example 1

In 300 ml of water was dissolved 0.85 g of imidazole. To the resulting solution was added 1.2 ml of concentrated hydrochloric acid to allow the reaction to proceed, to form a compound of the formula (2). To the reaction mixture was added with stirring 50 ml of an aqueous solution of 4.3 g of sodium tetraphenylborate to allow the reaction to proceed, to obtain 4.5 g of the intended imidazolium tetraphenylborate (as white precipitate) having a melting point of 185° to 188°C.

Preparation Example 2

In 300 ml of water was dissolved 1.6 g of 2-ethyl-4-methylimidazole. To the solution was added 1.2 ml of concentrated hydrochloric acid to allow the reaction to proceed, to form a compound of the formula (2). To the solution was added with stirring 50 ml of an aqueous solution of 4.3 g of sodium tetraphenylborate to allow the reaction to proceed, to obtain 5.5 g of the intended 2-ethyl-4-methylimidazolium tetraphenylborate (as white precipitate) having a melting point of 186°–190°C.

Preparation Example 3

In 300 ml of methyl alcohol was dissolved 2.6 g of 1-cyanoethyl-2-phenylimidazole. To the solution was added 1.2 ml of concentrated hydrochloric acid to allow the reaction to proceed, to form a compound of the formula (2). To the reaction mixture was added with stirring 50 ml of an aqueous solution of 4.3 g of sodium tetraphenylborate to allow the reaction to proceed, to obtain 6.0 g of the intended 1-cyanoethyl-2-phenylimidazolium tetraphenylborate (as white precipitate) having a melting point of 105° – 110°C.

Preparation Example 4

In 300 ml of methyl alcohol was dissolved 2.4 g of 1-cyanoethyl-2-undecylimidazole. To the solution was added 0.8 ml of concentrated hydrochloric acid to allow the reaction to proceed, to form a compound of the formula (2). To the reaction mixture was added with stirring 50 ml of an aqueous solution of 2.9 g of sodium tetraphenylborate to allow the reaction to proceed, to obtain 5.0 g of the intended 1-cyanoethyl-2-undecylimidazolium tetraphenylborate (as white precipitate) having a melting point of 95° – 98°C.

Preparation Example 5

In 300 ml of methyl alcohol was dissolved 2.2 g of 1-cyanoethyl-2-ethyl-4-methylimidazole. To the solution was added 1.2 ml of concentrated hydrochloric acid to allow the reaction to proceed, to form a compound of the formula (2). To the reaction mixture was added with stirring 50 ml of an aqueous solution of 4.3 g of sodium tetraphenylborate to allow the reaction to proceed, to obtain 6.0 g of the intended 1-cyanoethyl-2- ethyl-4-methylimidazolium tetraphenylborate (as white precipitate) having a melting point of 160° – 162°C.

Preparation Example 6

In 100 ml of methyl alcohol was dissolved 1.2 g of 2-ethyl-4-methylimidazole. To the solution was added 1.5 g methyl iodide and the mixture was refluxed for about 3 hours. After completion of the reaction, the excess methyl iodide and the methyl alcohol were removed by distillation to obtain a compound of the formula (2). The resulting compound was again dissolved in 300 ml of methyl alcohol. To the solution was added with stirring 50 ml of an aqueous solution of 3.4 g of sodium tetraphenylborate to allow the reaction to proceed, to obtain 4.5 g of the intended 2-ethyl-1,4-dimethyl-imidazolium tetraphenylborate (as white precipitate) having a melting point of 233° – 236°C.

The amount of the above-said ITPB to be used has no particular limitation. In ordinary cases, it is sufficient to use ITPB in a proportion of 0.01 to 30 parts by weight per 100 parts by weight of the epoxy resin. When the epoxy resin is to be cured with the above-said ITPB alone, particularly preferable is the range of from 0.5 to 20 parts by weight per 100 parts by weight of the epoxy resin. When the amount of ITPB is kept in the said range, the resulting composition is excellent in storage stability, and also in curability at practicable curing temperatures, and the cured product obtained has desirable characteristics. The composition comprising an epoxy resin and ITPB may be further blended with a curing catalyst for use in epoxy resins. By the addition of a small amount of such a curing catalyst, a great effect on acceleration of curing is obtained. Examples of the curing catalysts are boron trifluoride-amine complexes, tertiary amines, and organometal salts. These catalysts may be used alone or in admixture of two or more. It is sufficient to use the curing catalyst in an amount in the range of 0.01 to 20 parts by weight per 100 parts by weight, depending, to some extent, on the type of catalyst. Although the curing catalyst may be used in larger amounts, the cured product becomes inferior in characteristic properties.

In this invention, the aforesaid ITPB can be incorporated into a known epoxy resin-acid anhydride curing agent system, epoxy resin-amine-type curing agent system, and in other epoxy resin compositions obtained by blending an initial condensation product of synthetic resins such as phenol resin, urea resin, and melamine resin; a polyamide resin; or a polysulfide resin with an epoxy resin. By such additional incorporation of ITPB, the curing time at an elevated temperature can be greatly shortened without deteriorating the characteristics inherent in the resin composition. Examples of curing agents of the acid anhydride type are maleic anhydride, dichloromaleic anhydride, dodecenylsuccinic anhydride, pyromellitic dianhydride, trimellitic anhydride, phthalic anhydride, tetrahydrophthalic anhydride, methyltetrahydrophthalic anhydride, hexahydrophthalic anhydride, endomethylenetetrahydrophthalic anhydride, methylendomethylenetetrahydrophthalic anhydride, and hexachloroendomethylenetetrahydrophthalic anhydride. These anhydrides may be used alone or in admixture of two or more. Examples of the amine-type curing agents are aliphatic polyamides such as polymethylenediamine, polyetherdiamine, iminobispropylamine, bis(hexamethylene)triamine, tetraethylenepentamine, and dimethylaminopropylamine; cycloaliphatic polyamines such as menthanediamine, N-aminoethylpiperazine, and 1,3-diaminocyclohexane; aliphatic amines having an aromatic ring such as tetrachloro-p-xylenediamine: aromatic amines such as m-phenylenediamine, diaminodiphenyl ether, diaminodiphenylmethane, 4,4'-diaminodiphenylmethane-3,3'-dicarbonic acid, diaminodiphenyl sulfone, benzidine, 4,4'-bis(o-toluidine), 4,4'-thiodianiline, dianisidine, methylenebis(o-chloroaniline), bis(3,4-diaminophenyl) sulfone, and diaminoditolyl sulfone; and dicyanidiamide. These amines may be used alone or in admixture of two or more.

The aforesaid ITPB imparts rapid-curing property to the system comprising an epoxy resin and the above-noted curing agent, and a more striking effect is obtained particularly with a system comprising an aromatic amine curing agent which has a relatively low reactivity to an epoxy resin because of its low basicity, steric hindrance due to the aromatic ring, and formation of a high-melting solid in the B-stage during the progress of cure. In this case, the shelf life or potting life of the composition at around room temperature is far superior to that of a conventional composition.

The amount of the acid anhydride type curing agents or the amine type curing agents has no special limitation and can be determined in accordance with the formulation of a conventional epoxy resin composition. It is desirable to use an acid anhydride or amine curing agent in such an amount that the ratio of epoxy equivalent to acid anhydride equivalent or amine equivalent becomes 1 : 0.1 – 0.5. However, if necessary, the said ratio may be varied in a range of 1 : 0.001 to 2.0. In this invention, when ITPB is used together with the above-said curing agent, the amount of ITPB used has no particular limitation. In ordinary cases, the object of the invention is sufficiently achieved by using 0.01 to 20 parts by weight of ITPB per 100 parts by weight of the epoxy resin. The amount of ITPB is preferably 0.5 to 5, particularly preferably 2 to 3, parts by weight per 100 parts by weight of the epoxy resin. If ITPB is used in too small an amount, a desirable curing rate is unobtainable, whilst if it is used in excess, not only the composition becomes inferior in some degree shelf life or potting life, but also the cured product tends to decrease in thermal stability and chemical resistance.

The term "epoxy resin" used herein means a whole range of hitherto known epoxy resins including bisphenol-based epoxy resins such as those obtained from bisphenol-A and epichlorohydrin; novolac-based epoxy resins obtained by reacting epichlorohydrin with a novolac resin; polyphenol-based epoxy resins obtained by reacting epichlorohydrin with condensates of phenols and xylene resins or toluene resins formed by reaction between xylene and formalin or between toluene and paraformaldehyde, respectively; polyhydroxybenzene-based epoxy resins obtained by reacting epichlorohydrin with polyhydric phenols such as resorcinol and hydroquinone; epoxy resins obtained by reacting epichlorohydrin with aromatic or aliphatic carboxylic acids; epoxy resins obtained from vinyl polymers; epoxy resins obtained from polyhydric alcohols such as glycerol; epoxy resins obtained from cycloaliphatic compounds such as cyclohexene, cyclopentadiene, and dicyclopentadiene; epoxy resins obtained from the naturally occurring products such as starch and unsaturated higher fatty acids; nitrogen-containing epoxy resins obtained from aniline or aliphatic amines; epoxy resins having a nitrogen-containing hetero ring obtained from isocyanuric acid; silicon-containing epoxy resins obtained by reacting a silanol with epoxy resins; silicon-containing epoxy resins obtained by oxidation of silicon-containing compounds having carbon-to-carbon double bonds; epoxidized phospherous esters obtained by epoxidizing phospherous esters having olefinic unsaturation with peracetic acid; and epoxy resins containing in the form of a chelate heavy metal other than silicon and phosphorus. These epoxy resins may be used alone or in admixture of two or more.

The epoxy resin composition of this invention may be incorporated with other synthetic resins such as, for example, phenolic resins and melamine resins; powdered fillers such as, for example, glass, quartz glass, mica, calcium carbonate, calcium sulfate, barium sulfate, alumina, talc, clay, zirconium silicate (zircon), zirconium oxide, lithium aluminum silicate, beryl, aluminum silicate, beryllia, calcium silicate, and silica; flexibilizers such as, for example, polyethylene glycol, dimer acid, dodecenylsuccinic anhydride, polyamide resins, polysulfide resins, and urethane elastomers; releasing agents such as, for example, stearic acid, metal salts of stearic acid, silicone oils, silicone greases, fatty acids, fatty acid esters, and naturally occurring waxes; diluents such as, for example, olefin oxides, glycidyl methacrylate, cyclohexene vinyl monoxide, styrene oxide, phenyl glycidyl ether, butadiene oxide, diglycidyl ether, bis(2,3-epoxycyclopentyl) ether, and divinylbenzene dioxide; surface coupling agents such as, for example, γ-glycidoxypropyltrimethoxysilane, vinyltrichlorosilane, and n-(trimethoxysilylpropyl)ethylenediamine; or colorants such as, for example, carbon black, titanium oxide, antimony oxide, Cadmium Red, Toluidine Red, Hansa Yellow, powdered iron oxide, Phthalocyanine Blue, and Phthalocyanine Green. The amount of the above-noted additives used can be determined according to that conventionally used for respective purposes.

The epoxy resin composition of this invention is very useful, as mentioned hereinbefore, as a material for casting, molding, laminating, impregnating, adhering, and coating. Moreover, as a result of further investigations, the present inventors have found that the present composition is veryr effective when used as a material for encapsulating various semiconductor devices. When a conventional epoxy resin composition is used in encapsulating a semiconductor device, owing to a curing catalyst contained in the composition, a channel is generated at the time of use of the semiconductor device, whereby a leakage current is emitted which markedly decreases the reliability of the device. Such a tendency becomes more pronounced in a device having more sensitive surface such as field effect transistor (FET), and in a device exposed to higher temperatures. To the contrary, such a tendency is insignificant with the present epoxy resin composition. In encapsulating a semiconductor device by use of the present epoxy resin composition, the parasitic channel generation can be effectively suppressed by incorporating in the composition an organic zinc compound as an additive. Examples of useful organic zinc compounds include zinc salicylate, zinc octoate, zinc stearate, zinc ethylenediaminetetraacetate, zinc acetate, zinc terephthalate, zinc lactate, zinc ethylphenyldithiocarbamate, 2-mercaptobenzothiazole zinc salt, and the like. The amount of organic zinc compound to be incorporate is preferably 0.1 to 5 % by weight based on the total weight of the epoxy resin composition, because if the incorporated amount is less than 0.1 % by weight, the effect of addition becomes practically insignificant, whilst if the amount exceeds 5 % by weight, the cured material (encapsulating resin (layer)) becomes higher in linear thermal expansion coefficient ($\alpha$) and lower in mechanical strengths, particularly in brittleness.

As a result of extensive investigations, the present inventors have found that when ITPB and an amine-type curing agent are jointly used, the epoxy resin composition becomes susceptible to wet mixing; in other words, the resin component in the softened or molten state may be mixed together with ITPB and an amine-type curing agent. To the contrary, when a conventional solid epoxy resin incorporated with an amine-type curing agent is mixed at 60° to 85°C., curing reaction begins to take place during the mixing operation even if a relatively stable boron trifluorideamine complex is used as the curing agent, thus resulting in an epoxy resin composition having a shelf life or patting life too short for practical uses. Therefore, that an epoxy resin composition can be wet-mixed, as is the case with the present composition, is a novel fact which has never been observed. The industrial advantage of such a composition is manifested in simplification of the operation and in increased productivity. In this invention, the necessary conditions for wet mixing are such that the mixing temperature is 40° to 85°C. and the solid epoxy resin in the softened or molten state is mixed while applying a shearing force. The shearing force can be applied by use of various means including as representatives a mixing roll, Ko-kneader extruder, ribbon mixer, extruder, and the like.

The present inventors have confirmed that various combinations of the aforesaid components achieve the object of this invention. Several of the combinations are shown in the following Examples.

EXAMPLE 1

In 100 parts by weight of an epoxy resin (Epikote 828, Shell Chemical Co.; epoxy equivalent, about 190) comprising glycidyl ether of bisphenol-A as the major constituent, was incorporated 20 parts by weight of an ITPB as shown in Table 1, to obtain the intended epoxy resin composition (Sample No. 1 and No. 2).

COMPARATIVE EXAMPLE 1

In 100 parts by weight of Epikote 828 was incorporated 2 parts by weight of 2-ethyl-4-methyl-imidazole (Sample No. 3), or 10 parts by weight of boron trifluoride-piperidine complex (Sample No. 4), or 5 parts by weight of boron trifluoride-monoethylamine complex (Sample No. 5) each as a known curing agent to prepare three samples of known epoxy resin compositions. In Tables 1 and 2, there are shown gel time at 150°C. and 120°C., potting life when stored at 40°C., and the ratio of potting life to gel time. The potting life is a measure of the storage stability of a resin composition and shown in terms of hours or days which had elapsed until the viscosity of a resin composition reached a value ten times the initial viscosity value (viscosity of the composition immediately after preparation).

Table 1

| Sample No. | ITPB | (Example 1) Gel time (hour) 150°C. | 120°C. | Potting life (hour) | Potting life/gel time G 150°C. | G 120°C. |
|---|---|---|---|---|---|---|
| 1 | 2-Ethyl-4-methyl-imidazolium tetraphenyl-borate | 0.8 | 0.5 | 550 | 688 | 110 |
| 2 | 1-Cyanoethyl-2-phenyl-imidazolium tetraphenyl-borate | 0.9 | 5.5 | 480 | 533 | 87 |

Table 2

| Sample No. | (Comparative Example 1) Gel time (hour) 150°C. | 120°C. | Potting life (hour) | Potting life/gel time G 150°C. | G 120°C. |
|---|---|---|---|---|---|
| 3 | 0.3 | 1.2 | 45 | 150 | 38 |
| 4 | 0.4 | 5.0 | 110 | 275 | 18 |
| 5 | 0.2 | 1.5 | 505 | 2525 | 337 |

Note: In the column of "potting life/gel time" in Table 1 and Table 2, G 150°C. means the ratio of potting life to gel time at 150°C., and G 120°C. means the ratio of potting life to gel time at 120°C. The said ratio is a measure of the latent curability.

Sample No. 1 (Example 1) and Samples No. 3 and 5 (Comparative Example 1) were cured by heating at 120°C. for 6 hours and at 150°C. for 15 hours. The mechanical properties of the cured samples were shown in Table 3, and the electrical properties in Table 4.

Table 3

| Item of test Sample No. | (measured at 100°C.) Tensile strength (kg/cm$^2$) | Elongation (%) | Modulus of elasticity (kg/cm$^2$) |
|---|---|---|---|
| 1 | 345 | 4.0 | $1.5 \times 10^4$ |
| 3 | 300 | 2.5 | $1.5 \times 10^4$ |
| 5 | 275 | 2.6 | $1.2 \times 10^4$ |

EXAMPLE 2

An epoxy resin composition (varnish) was prepared by uniformly mixing 75 parts by weight of an epoxy novolac-type epoxy resin (Epikote 154, Shell Chemical Co.; epoxy equivalent, 176 – 181), 25 parts by weight of a bisphenol-A-based epoxy resin (Epikote 1001, Shell Chemical Co.; epoxy equivalent, 450 – 500), 3 parts by weight of 2-ethyl-4-methylimidazolium tetraphenylborate, and 100 parts by weight of methyl ethyl ketone as solvent. The resulting varnish was stable for more than 3 months at 25°C., indicating a favorable storage stability.

A piece of insulating mica tape composed of composite mica, 1 mm in thickness, backed with nonwoven polyester fabric, 0.05 mm in thickness, was impregnated with the varnish obtained above and dried in a drying oven at 120°C. for about 5 minutes to obtain a prepreg mica insulating tape. The amount of impregnated varnish was 30 to 35 % by weight as solids. The prepreg tape obtained was wound in 5 layers around a flat type copper wire (coil conductor), 3 mm × 20 mm × 300 mm, and cured by heating at 150°C. for 1 hour to obtain a model coil. The model coil was provided with exterior electrodes and measured for temperature characteristics and voltage characteristics of tan δ. The results obtained were as shown in Table 5 and Table 6.

Table 4

| Item of test Sample No. | Tanδ(%) 25°C. | 80°C. | 120°C. | ε 25°C. | 80°C. | 120°C. | ρ(Ω-cm) 25°C. | 80°C. | 120°C. |
|---|---|---|---|---|---|---|---|---|---|
| 1 | 0.7 | 1.5 | 6.9 | 3.5 | 3.8 | 4.0 | $1.2 \times 10^{16}$ | $3.5 \times 10^{13}$ | $5.5 \times 10^{11}$ |
| 3 | 0.7 | 3.0 | >10 | 3.6 | 4.0 | 4.4 | $1.5 \times 10^{15}$ | $2.0 \times 10^{12}$ | $1.0 \times 10^{10}$ |
| 5 | 0.7 | 2.6 | >10 | 4.9 | 5.2 | 6.5 | $4.5 \times 10^{14}$ | $6.0 \times 10^{12}$ | $8.0 \times 10^{11}$ |

Note: In Table 4, tan δ and ε were obtained by measurement at 60 Hz.

From the results shown in Table 1 and Table 2, it is seen that as compared with an imidazole (Sample No. 3) and boron trifluoride-piperidine complex (Sample No. 4), the imidazolium tetra-substituted borates (Samples No. 1 and No. 2) show a high reactivity at elevated temperatures and a prolonged potting life at low temperatures, indicating their superior latent curability. Boron trifluoride-monoethylamine complex (Sample No. 5) is superior in latent curability to Samples No. 1 and No. 2, whilst markedly inferior in mechanical and electrical properties of the cured product, as is apparent from the results shown in Table 3 and Table 4. The said complex presents, in addition, a serious problem with respect to moisture resistance of the cured product, as disclosed hereinafter.

Table 5

| (temperature characteristics) Temperature of measurement (°C.) | Tan δ(%) |
|---|---|
| 20 | 0.6 |
| 60 | 0.8 |
| 100 | 2.0 |
| 120 | 4.5 |

Note: Measured at a voltage of 2 kV and a frequency of 50 Hz.

Table 6

| Voltage of measurement (kV) | tan δ(%) |
|---|---|
| 2 | 0.6 |
| 4 | 0.8 |
| 6 | 1.2 |
| 8 | 1.5 |
| 10 | 2.0 |

Note: Measurement was made at 20°C. and a frequency of 50 Hz.

The dielectric breakdown voltage of the model coil was about 30 to 40 kV/mm (20°C.).

The flexural strength was measured on a cylindrical mica tape cured layer prepared by removing the coil conductor from the model coil. The results obtained were as shown in Table 7.

Table 7

| Condition | Temperature of measurement (°C.) | |
|---|---|---|
| | 20 | 120 |
| Initial | 1500 kg/cm² | 1300 kg/cm² |
| After heated at 150°C. for 30 days | 1650 kg/cm² | 1350 kg/cm² |

EXAMPLE 3

Epoxy resin compositions (Sample Nos. 6 to 10) were prepared by mixing 100 parts by weight of an epoxy resin (Epikote 828, Shell Chemical Co.; epoxy equivalent, about 190) comprising diglycidyl ether of bisphenol-A as the major constituent, 89 parts by weight of a curing agent (MHAC-P, Hitachi Chemical Co.) comprising methylbicyclo (2,2,1)heptene-2,3-dicarboxylic acid anhydride as the major constituent, and 1 part by weight of an imidazolium tetrasubstituted borate shown in Table 8.

EXAMPLE 4

Epoxy resin compositions (Sample Nos. 11 to 13) were obtained by mixing 100 parts by weight of a cycloaliphatic epoxy resin (Chissonox 221, Chisso Co., epoxy equivalent, 133), 65 parts by weight of MHAC-P65, and 0.5 part by weight of an imidazolium tetrasubstituted borate shown in Table 8.

COMPARATIVE EXAMPLE 2

Epoxy resin compositions (Samples No. 14 and No. 15) were prepared by mixing 100 parts by weight of Epikote 828, 89 parts by weight of MHAC-P, and 0.5 part by weight of a known curing catalyst shown in Table 9.

COMPARATIVE EXAMPLE 3

Epoxy resin compositions (Samples No. 16 and No. 17) were prepared by mixing 100 parts by weight of Chissonox-221, 65 parts by weight of MHAC-P, and 5 parts by weight of a known curing catalyst shown in Table 9.

The gel times at 150°C., 120°C., and 100°C., the potting lives when kept at 40°C., and the ratios of potting life to gel time of the epoxy resin compositions obtained in Examples 3 and 4 and Comparative Examples 2 and 3 were as shown in Table 8 and Table 9.

Table 8

| | | (Examples 3 and 4) | | | Potting | Potting life/ | |
|---|---|---|---|---|---|---|---|
| Sample | | Gel time (hour) | | | life | gel time | |
| No. | ITPB | 150°C. | 120°C. | 100°C. | (hour) | G 150°C. | G 120°C. |
| 6 | Imidazolium tetraphenylborate | 0.2 | 0.7 | 2.1 | 145 | 725 | 207 |
| 7 | 2-Ethyl-4-methylimidazolium tetraphenylborate | 0.2 | 0.9 | 2.9 | 250 | 1250 | 280 |
| 8 | 1-Cyanoethyl-2-ethyl-4-methylimidazolium tetraphenylborate | 0.2 | 1.0 | 3.5 | 240 | 1200 | 240 |
| 9 | 1-Cyanoethyl-2-undecylimidazolium tetraphenylborate | 0.2 | 0.9 | 3.2 | 215 | 1075 | 239 |
| 10 | 1-Cyanoethyl-2-phenylimidazolium tetraphenylborate | 0.2 | 0.9 | 3.0 | 210 | 1050 | 233 |
| 11 | Imidazolium tetraphenylborate | 0.1 | 0.2 | 0.6 | 40 | 400 | 200 |
| 12 | 2-Ethyl-4-methylimidazolium tetraphenylborate | 0.15 | 0.4 | 0.9 | 45 | 300 | 112 |
| 13 | 1-Cyanoethyl-2-ethyl-4-methylimidazolium tetraphenylborate | 0.2 | 0.8 | 1.4 | 45 | 225 | 56 |

Table 9

| | | (Comparative Examples 2 and 3) | | | Potting | Potting life/ | |
|---|---|---|---|---|---|---|---|
| Sample | | Gel time (hour) | | | life | gel time | |
| No. | Curing agent | 150°C. | 120°C. | 100°C. | (hour) | G 150°C. | G 120°C. |
| 14 | Imidazole | 0.2 | 0.5 | 1.5 | 45 | 225 | 90 |
| 15 | 2-Ethyl-4-methylimidazole | 0.2 | 0.6 | 2.0 | 60 | 300 | 100 |
| 16 | Imidazole | 0.15 | 0.5 | 1.0 | 25 | 167 | 50 |
| 17 | 2-Ethyl-4-methylimidazole | 0.2 | 0.7 | 2.3 | 36 | 180 | 51 |

Note: In the column of "potting life/gel time" in Table 8 and Table 9, G150°C. means the ratio of potting life to gel time at 150°C., and G 120°C. means the ratio of potting life to gel time at 120°C.

The epoxy resin compositions of Sample No. 7 (Example 3) and Sample No. 15 (Comparative Example 2) were cured by heating at 120°C. for 3 hours. The electrical and mechanical properties of the cured samples obtained were as shown in Table 10 and Table 11, respectively.

Table 10

| Item of test Sample No. | Tan δ(%) 25°C. | 80°C. | 120°C. | ε 25°C. | 80°C. | 120°C. | ρ(Ω-cm) 25°C. | 80°C. | 120°C. |
|---|---|---|---|---|---|---|---|---|---|
| 7 | 0.3 | 0.5 | 1.2 | 3.4 | 3.6 | 3.8 | >10$^{16}$ | 3 × 10$^{15}$ | 5 × 10$^{12}$ |
| 15 | 0.4 | 0.8 | 5.5 | 3.8 | 4.2 | 5.0 | >10$^{16}$ | 2 × 10$^{15}$ | 8 × 10$^{11}$ |

Note: In Table 10, the values of tan δ and ε were obtained by measurement at 60 Hz.

Table 11

| Item of test Sample No. | Tensile strength (kg/cm$^2$) | Elongation (%) | Modulus of elasticity (kg/cm$^2$) | Heat distortion temp. (°C.) |
|---|---|---|---|---|
| 7 | 530 | 5.0 | 1.3 × 10$^4$ | 128 |
| 15 | 350 | 8.5 | 1.1 × 10$^4$ | 115 |

Note: The values of tensile strength, elongation, and modulus of elasticity given in Table 11 were obtained by measurement at 100°C.

EXAMPLE 5

An epoxy resin composition for use as an adhesive was prepared by uniformly mixing 100 parts by weight of vinylcyclohexene dioxide (Chissonox 206, Chisso Co.; epoxy equivalent, 76), 100 parts by weight of hexahydrophthalic anhydride, 3 parts by weight of 2-ethyl-4-methylimidazolium tetraphenylborate, and 2,300 parts by weight of powdered zirconium silicate which had been surface-treated with a coupling agent comprising γ-glycidoxypropyltrimethoxysilane. The composition obtained was sufficiently usable even after having been stored at 25°C. for 3 months or more, indicating a good storage stability.

The adhesive composition thus obtained was used to bond two ceramic rods, 300 mm in diameter, to each other. Curing was conducted for 10 hours at 60°C., and for a further 3 hours at 150°C. The linear thermal expansion coefficient (α) of the cured adhesive was 9.6 × 10$^{-6}$/°C. (the linear thermal expansion coefficient of the ceramic rods itself being 5.3 × 10$^{-6}$/°C.). The flexural strength of the bonded portion was 1,700 kg/cm$^2$ (initial), 610 kg/cm$^2$ after having been immersed in boiling water for 100 hours, and 680 kg/cm$^2$ after having been subjected to a 100-cycle of thermal shock test, one cycle consisting of an exposure to a temperature of 100°C. for 2 hours followed by allowing to stand at −50°C for 2 hours.

As is apparent from the above results, the epoxy resin composition of this invention had a good adhesive strength comparable to that of a conventional adhesive, and, moreover, was sufficiently satisfactory in both storage stability and curability, which is the main object of this invention.

EXAMPLE 6

Epoxy resin compositions (Sample Nos. 19 to 23, 25, 27, and 31) were obtained by dissolving various solid epoxy resins, amine-type curing agents, and ITPB in methyl Cellosolve according to the formulations shown in Table 12 so that the solids content of the composition became 50 % by weight. Each of the compositions thus obtained was tested for the gel time at 170°C. and 200°C. and for the potting life when kept in a closed vessel at 40°C. The results obtained were as shown in Table 13. The potting life was shown, as mentioned above, in terms of days which had elapsed before the viscosity of the resin composition reached a value 10 times the initial viscosity value (viscosity at the time of preparation). In Tables 12 and 13, there are also shown comparative examples (Sample Nos. 18, 24, 26, 28 and 30) wherein ITPB was not used.

Table 12

| Sample No. | Epoxy resin (parts by weight) | Amine-type curing agent (parts by weight) | ITPB (parts by weight) |
|---|---|---|---|
| 18 | Epikote 1001 (100) | Methylenebis(o-chloroaniline) (13.4) | — |
| 19 | " | " | Imidazolium tetraphenylborate (3) |
| 20 | " | " | 2-Methylimidazolium tetraphenylborate (3) |
| 21 | " | " | 2-Phenylimidazolium tetraphenylborate (3) |
| 22 | " | " | 2-Ethyl-4-methylimidazolium tetraphenylborate (3) |
| 23 | " | " | 2-Ethyl-4-methylimidazolium tetra-N-butylborate (2) |
| 24 | " | Diaminodiphenyl sulfone (12.4) | — |
| 25 | " | " | 2-Ethyl-4-methylimidazolium tetraphenylborate (3) |
| 26 | " (100) | Dicyandiamide (4.2) | — |
| 27 | " | " | 2-Ethyl-4-methylimidazolium tetraphenylborate (2) |
| 28 | ECN-1273 (100) | Methylenebis(o-chloroaniline) (27.7) | — |
| 29 | " | " | 2-Ethyl-4-methylimidazolium tetraphenylborate (5) |
| 30 | DER-511 (100) | " (15.8) | — |
| 31 | " | " | 2-Ethyl-4-methylimidazolium tetraphenylborate (5) |

Note: In Table 12, "Epikote 1001" is a bisphenol-A diglycidyl ether-type epoxy resin (epoxy equivalent 456) produced by Shell Chemical Co.; "ECN-1273" is a novolac-based epoxy resin (epoxy equivalent 242) produced by CIBA Ltd.; and "DER-511" is a brominated bisphenol-A diglycidyl ether-type epoxy resin (epoxy equivalent 485) produced by Dow Chemical Co.

Table 13

| Sample No. | Gel time (min.) 170°C. | 200°C. | Potting life (days) |
|---|---|---|---|
| 18 | 40 | 17 | >100 |
| 19 | 3.2 | 1.1 | >100 |
| 20 | 3.5 | 1.2 | >100 |
| 21 | 3.4 | 1.2 | >100 |
| 22 | 3.6 | 1.3 | >100 |
| 23 | 2.1 | 0.8 | 50 |
| 24 | 35 | 15 | >100 |
| 25 | 2.8 | 1.5 | >100 |
| 26 | 4.0 | 1.3 | 70 |
| 27 | 1.8 | 0.6 | 60 |
| 28 | 26 | 9 | >100 |
| 29 | 3.1 | 1.3 | >100 |
| 30 | 260 | 20 | >100 |
| 31 | 5.5 | 1.4 | >100 |

EXAMPLE 7

Epoxy resin compositions (Sample Nos. 33, 35, and 37) were obtained according to the formulations given in Table 14 by dissolving an amine-type curing agent in a liquid epoxy resin, and adding to the resulting solution, after having been cooled, an ITPB to dissolve therein. The gel times and potting lives of the resin compositions thus obtained were as shown in Table 15. In Tables 14 and 15, there are also shown comparative examples (Sample Nos. 32, 34 and 36) wherein no ITPB was used.

Table 14

| Sample No. | Epoxy resin (parts by weight) | Amine-type curing agent (parts by weight) | ITPB (Parts by weight) |
|---|---|---|---|
| 32 | Epikote 828 (100) | Methylenebis(o-chloroaniline) (34.0) | — |
| 33 | " | " | 2-Ethyl-4-methylimidazolium tetraphenylborate (5) |
| 34 | " | Diaminodiphenylmethane (31.5) | — |
| 35 | " | " | 2-Ethyl-4-methylimidazolium tetraphenylborate (5) |
| 36 | " | Dicyandiamide (10.7) | — |
| 37 | " | " | 2-Ethyl-4-methylimidazolium tetraphenylborate (3) |

Table 15

| Sample No. | Gel time (min.) 170°C. | Gel time (min.) 200°C. | Potting life (day) |
|---|---|---|---|
| 32 | >60 | >30 | >100 |
| 33 | 5.2 | 2.5 | >100 |
| 34 | >60 | >30 | >100 |
| 35 | 6.3 | 2.9 | >100 |
| 36 | >60 | >30 | >100 |
| 37 | 4.6 | 2.1 | >100 |

Note: In Table 15, "Epikote 828" is a liquid epoxy resin of the bisphenol-A diglycidyl ether type (epoxy equivalent, 197) produced by Shell Chemical Co.

COMPARATIVE EXAMPLE 4

According to the formulations given in Table 16, methyl Cellosolve solutions (varnish) (Sample Nos. 38 to 43) containing an epoxy resin, amine-type curing agent, and curing catalyst were prepared. The gel times and potting lives of the varnishes thus obtained were as shown in Table 17.

Table 16

| Sample No. | Epoxy resin (parts by weight) | Amine-type curing agent (parts by weight) | Curing catalyst (parts by weight) |
|---|---|---|---|
| 38 | Epikote 1001 (100) | Methylenebis(o-chloroaniline) (13.4) | 2-Ethyl-4-methylimidazole (0.5) |
| 39 | " | " | $BF_3$-monoethylamine compound (0.5) |
| 40 | ECN-1273 (100) | " (27.7) | 2-Ethyl-4-methylimidazole (0.5) |
| 41 | " | " | $BF_3$-monoethylamine compound (0.5) |
| 42 | DER-511 (100) | " (15.8) | 2-Ethyl-4-methylimidazole (0.5) |
| 43 | " | " | $BF_3$-monoethylamine compound (0.5) |

Table 17

| Sample No. | Gel time (min.) 170°C. | Gel time (min.) 200°C. | Potting life (day) |
|---|---|---|---|
| 38 | 3.0 | 1.0 | 35 |
| 39 | 4.5 | 1.2 | 90 |
| 40 | 3.2 | 1.3 | 25 |
| 41 | 2.6 | 0.5 | 95 |
| 42 | 2.9 | 2.0 | 10 |
| 43 | 4.0 | 1.3 | 95 |

EXAMPLE 8

A piece of glass cloth was impregnated with the varnish shown in Table 18 and dried at 150°C. for 10 minutes to prepare a prepreg having a resin content of about 55 %. In Table 18 is also shown the formulation of Comparative Example 5.

Table 18

| Example 8 (parts by weight) | | Comparative Example (parts by weight) | |
|---|---|---|---|
| DER-511 | (90) | DER-511 | (90) |
| Epikote 828 | (10) | Epikote 828 | (10) |
| Methylenebis(o-chloroaniline) | (9.7) | Methylenebis(o-chloroaniline) | (9.7) |
| 2-Ethyl-4-methylimidazolium tetraphenylborate | (3) | $BF_3$-monoethylamine compound | (1) |
| Methyl ethyl ketone | (112.7) | Methyl ethyl ketone | (110.7) |

Five sheets of each of the prepregs obtained in Example 8 and Comparative Example 5 were pressed at 170°C. under pressure of 50 kg/cm$^2$ for 1 hour to yield laminated sheets, 0.6 mm in thickness. The laminated sheets were evaluated for the moisture resistance which is believed to be most adversely affected by a $BF_3$-amine compound. The evaluation was made by inspecting the appearance of the laminated sheet after having been immersed in boiling water. The results obtained were as shown in Table 19.

Table 19

| Test condition Sample | Duration of immersion in boiling water | | |
|---|---|---|---|
| | 30 minutes | 1 hour | 4 hours |
| Example 8 | No change | No change | No change |
| Comparative Example 5 | Local measling | Measling all over the surface | — |

As is apparent from Table 19, when an imidazolium tetra-substituted borate was used according to this invention, the moisture resistance of the laminate presented no problem at all, whereas when a conventional $BF_3$-amine compound was used, the reduced moisture resistance of the laminate presented a difficult problem. The laminate obtained in Example 8 is also favorably comparable to that obtained from a conventional composition in electrical and mechanical properties and in thermal stability. The prepreg obtained in Example 8 also showed little change after having been allowed to stand at room temperature for more than 3 months, indicating a good storage stability.

As is apparent from the foregoing Examples and Comparative Examples, the accelerating effect of ITPB on curing reaction of an epoxy resin composition containing a curing agent of the acid anhydride type or the amine type is manifested hardly at room temperature but markedly at elevated temperatures. It has been known and also confirmed by Sample Nos. 39, 41, and 43 that a conventional boron trifluoride-amine complex is a curing catalyst also capable of showing a so-called latent curing ability. However, a cured product obtained by using a boron trifluoride-amine complex has a problem in moisture resistance, and hence, the range of its use is restricted. According to this invention, there is no problem about the moisture resistance, while a reduced moisture resistance of the cured product is the greatest disadvantage of boron trifluoride-amine complexes. The present composition is comparable favorably to a conventional composition containing a boron trifluoride-amine complex in electrical and mechanical properties of the cured product, and no problem is raised in this respect.

EXAMPLE 9

| | Parts by weight |
|---|---|
| a. Cresol-novolac-based epoxy resin (epoxy equivalent, 235) | 100 |
| b. Tetrahydrophthalic anhydride | 60 |
| c. 2-Ethyl-4-methylimidazolium tetraphenylborate | 3 |
| d. 2-Mercaptobenzothiazole zinc salt | 6 |
| e. Stearic acid | 2 |
| f. Carbon | 1 |
| g. Powdered quartz glass | 400 |

EXAMPLE 10

| | Parts by weight |
|---|---|
| a. Phenol-novolac-based epoxy resin (epoxy equivalent, 230) | 100 |
| b. Hexahydrophthalic anhydride | 50 |
| c. 2-Heptadecylimidazolium tetraphenylborate | 3 |
| d. Zinc terephthalate | 5 |
| e. Carnauba wax | 3 |
| f. Carbon | 1 |
| g. Powdered silica | 450 |

EXAMPLE 11

| | Parts by weight |
|---|---|
| a. Cresol-novolac-based epoxy resin (epoxy equivalent, 235) | 100 |
| b. Tetrahydrophthalic anhydride | 60 |
| c. 2-Ethyl-4-methylimidazolium | 3 |
| e. Stearic acid | 2 |
| f. Carbon | 1 |
| g. Powdered silica | 400 |

EXAMPLE 12

| | Parts by weight |
|---|---|
| a. Phenol-novolac-based epoxy resin (epoxy equivalent, 230) | |
| b. Hexahydrophthalic anhydride | 50 |
| c. 2-Heptadecylimidazolium tetraphenylborate | 3 |
| e. Carnauba wax | 3 |
| f. Carbon | 1 |
| g. Powdered silica | 450 |

COMPARATIVE EXAMPLE 6

| | Parts by weight |
|---|---|
| a. Phenol-novolac-based epoxy resin (epoxy equivalent, 230) | 100 |
| b. Hexahydrophthalic anhydride | 50 |
| c. 2-Heptadecylimidazole (curing promoter) | 3 |
| e. Carnauba wax | 3 |
| f. Carbon | 1 |
| g. Powdered silica | 450 |

COMPARATIVE EXAMPLE 7

| | Parts by weight |
|---|---|
| a. Cresol-novolac-based epoxy resin (epoxy equivalent, 235) | 100 |
| b. Tetrahydrophthalic anhydride | 60 |
| c. Boron trifluoride-monoethylamine | 3 |
| e. Stearic acid | 2 |
| f. Carbon | 1 |
| g. Powdered quartz glass | 400 |

Each of the formulations given in the foregoing Examples 9 to 12 and Comparative Examples 6 and 7 was blended with a mixing roll at 50° to 80°C. for 10 to 15 minutes, cooled, and pulverized.

By using the epoxy resin composition thus obtained, a modified field effect semiconductor integrated circuit device (modified FET-type IC) was encapsulated by transfer molding at 165°C. for 3 minutes. The encapsulated modified FET-type IC was tested for temperature dependency of the leakage current due to a parasitic channel in the following way. Under predetermined temperature conditions, a voltage of −24 V was applied to the gate for 1 hour, then a voltage of 12 V was applied between drain and source, and immediately thereafter the gate voltage was released. At the same time, the maximum leakage current which flowed between the source and drain ($I_{DP}$) was measured. The results obtained were as shown in Table 20.

Table 20

| Sample | Leakage current, $I_{np}$ (μA) | | | | | | |
|---|---|---|---|---|---|---|---|
| | 20°C. | 50°C. | 65°C. | 80°C. | 100°C. | 120°C. | 150°C. |
| Example 9 | 0 | 0 | 0 | 0 | 0 | 4 | 18 |
| Example 10 | 0 | 0 | 0 | 0 | 0 | 6 | 25 |
| Example 11 | 0 | 0 | 0 | 1 | 30 | 255 | 600 |
| Example 12 | 0 | 0 | 0 | 1 | 25 | 200 | 550 |
| Comparative Example 6 | 0 | 1 | 50 | 250 | 500 | 650 | 300 |
| Comparative Example 7 | 0 | 5 | 70 | 300 | 550 | 670 | 200 |

EXAMPLE 13

| | Parts by weight |
|---|---|
| a. o-Cresol-novolac-based epoxy resin (ECN 1299, CHIBA Ltd.; epoxy equivalent, 235) | 100 |
| b. 3,3'-Dichlorodiaminodiphenylmethane | 40 |
| c. Imidazole tetraphenylborate | 3 |
| e. Stearic acid | 2 |
| f. Carbon | 0.3 |
| g. Powdered quartz glass | 390 |

EXAMPLE 14

| | Parts by weight |
|---|---|
| a. Phenol-novolac-based epoxy resin (ERR 0100, Union Carbide Corp.; epoxy equivalent, 230) | 100 |
| b. 3,3'-Diaminodiphenyl sulfone | 35 |
| c. 2-Ethyl-4-methylimidazolium tetraphenylborate | 4 |
| e. Stearic acid | 2 |
| f. Carbon | 0.5 |
| g. Zirconium silicate | 1,000 |
| h. γ-Glycidoxypropyltrimethoxysilane | 2 |

EXAMPLE 15

| | Parts by weight |
|---|---|
| a. Bisphenol-A-based epoxy resin (Epikote 1004, Shell Chemical; epoxy equivalent, 1,500) | 100 |
| b. Diaminodiphenylmethane | 10 |
| c. 1-Cyanoethyl-2-ethyl-4-methylimidazolium tetraphenylborate | 3 |
| e. Hoechst wax | 3 |
| f. Carbon | 1 |
| g. Calcium carbonate | 800 |

EXAMPLE 16

| | Parts by weight |
|---|---|
| a. Heterocyclic epoxy resin (TGIC, CHIBA Ltd.; epoxy equivalent, 105) | 100 |
| b. 3,3'-Dichlorodiaminodiphenylmethane | 60 |
| c. 1-Cyanoethyl-2-phenylimidazolium tetraphenylborate | 5 |
| e. Carnauba wax | 3 |
| f. Carbon | 1 |
| g. Powdered quartz glass | 550 |

EXAMPLE 17

| | Parts by weight |
|---|---|
| a. Bisphenol-A-based epoxy resin (Epikote 1001, Shell Chemical Co.; epoxy equivalent, 400) | 100 |
| b. 3,3'-Dichlorodiaminodiphenylmethane | 35 |
| c. 2-Ethyl-4-methylimidazolium tetraphenylborate | 5 |
| e. Stearic acid | 3 |
| f. Carbon | 1 |
| g. Powdered alumina | 1,000 |

COMPARATIVE EXAMPLE 8

| | Parts by weight |
|---|---|
| a. ECN 1299 | 100 |
| b. 3,3'-Dichlorodiaminodiphenylmethane | 40 |
| c. 2-Heptadecylimidazole | 3 |
| e. Stearic acid | 2 |
| f. Carbon | 1 |
| g. Powdered quartz glass | 390 |

COMPARATIVE EXAMPLE 9

| | Parts by weight |
|---|---|
| a. ERR 0100 | 100 |
| b. 3,3'-Diaminodiphenyl sulfone | 35 |
| c. 2-Ethyl-4-methylimidazole | 4 |
| e. Stearic acid | 2 |
| f. Carbon | 0.5 |
| g. Zirconium silicate | 1,000 |
| h. γ-Glycidoxypropyltrimethoxysilane | 2 |

COMPARATIVE EXAMPLE 10

| | Parts by weight |
|---|---|
| a. Epikote 1004 | 100 |
| b. Diaminodiphenylmethane | 10 |
| c. 2-Undecylimidazole | 3 |
| e. Hoechst wax | 3 |
| f. Carbon | 1 |
| g. Calcium carbonate | 800 |

COMPARATIVE EXAMPLE 11

| | Parts by weight |
|---|---|
| a. ECN 1273 | 100 |
| b. Diaminodiphenylmethane | 25 |
| d. Zinc salicylate | 0.5 |
| e. Stearic acid | 2 |
| f. Carbon | 1 |
| g. Powdered quartz glass | 230 |

Each of the formulations shown in the foregoing Examples 13 to 17 and Comparative Examples 8 to 11 was blended with a mixing roll at 70° to 75°C. for 10 minutes to prepare an epoxy resin composition.

Potting lives at 25°C. of the resin compositions thus obtained were as shown in Table 21. On the other hand, in order to confirm uniform dispersion of powdered inorganic fillers throughout the resin composition, a semiconductor integrated circuit device was encapsulated with the resin composition by transfer molding and subjected to the heat cycle test to examine connection failure. Transfer molding was carried out at 165°C. for 3 minutes and the molded device was heated at 150° to 170°C. for 5 hours to finish curing of the resin. The thermal shock test was continued until connection failure took place in an inner lead wiring, and the number of thermal cycles was recorded to evaluate the dispersion of fillers [one thermal cycle consisted of an exposure to a temperature of 150°C. for 2 min. and cooling at −190°C. for 2 min. (in liquid nitrogen)]. In Table 21, the samples obtained in Comparative Examples 8 to 11 were marked with A and B to indicate duration of mixing. In A, the mixing time is 2 to 3 minutes and in B it is 10 minutes.

Table 21

| Sample | | Thermal shock test (number of cycles before connection failure takes place) | Potting life (days) |
| --- | --- | --- | --- |
| Example | 13 | ≥800 | 50 |
| " | 14 | ≥1,000 | 50 |
| " | 15 | 1,000 | 60 |
| " | 16 | 1,000 | 60 |
| " | 17 | 1,000 | 90 |
| Comparative Example 8 | A | 200 | 5 |
| | B | 300 | 2 |
| Comparative Example 9 | A | 300 | 3 |
| | B | 500 | 1 |
| Comparative Example 10 | A | 350 | 7 |
| | B | 600 | 3 |
| Comparative Example 11 | A | 100 | 3 |
| | B | 200 | 1 |

As seen from Table 21, the compositions of Examples 13 to 17 are excellent in both potting life and thermal shock characteristics. This means that favorable results are obtained in the thermal shock test because sufficiently uniform mixing of inorganic fillers and other ingredients has been ensured by wet mixing, and that such an intensive mixing has not brought about a decrease in potting life. To the contrary, in the case of the compositions of Comparative Examples 8 to 11, if the mixing time is kept short to avoid decrease in potting life, undesirable results are obtained in the thermal shock test, as seen from each A, because the ingredients, particularly powdered inorganic fillers, is not uniformly mixed, while if the mixing is sufficiently carried out, the potting life decreases so much that the composition becomes unsuitable for practical use, as shown by B.

What we claim is:

1. An epoxy resin composition consisting essentially of (a) 100 parts by weight of an epoxy resin having at least two vicinal epoxy groups and (b) 0.01 to 30 parts by weight of at least one organoboron compound selected from the group consisting of tetraphenyl borates of imidazole and tetraphenylborates of imidazole derivatives obtained by reacting alkali metal salts of tetraphenylboron with at least one member selected from the group consisting of salts of imidazole and salts of imidazole derivatives obtained by reacting imidazole or an imidazole derivative represented by the general formula:

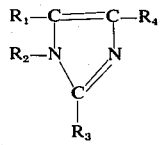

wherein $R_1$, $R_2$, $R_3$, and $R_4$, which may be same as or different from one another, are selected from the group consisting of hydrogen, alkyl groups having 1 to 20 carbon atoms, alkenyl groups having 2 to 6 carbon atoms, acyl groups having 2 to 7 carbon atoms, aryl groups having 6 to 12 carbon atoms, cycloalkyl groups having 6 to 12 carbon atoms, cycloalkenyl groups having 6 to 12 carbon atoms, aldehyde group, carboxyl group, cyano group, and nitro group, with acids.

2. An epoxy resin composition according to claim 1, wherein the amount of the at least one organoboron compound (b) is 0.5 to 20 parts by weight.

3. An epoxy resin composition consisting essentially of (a) 100 parts by weight of an epoxy resin having at least two vicinal epoxy groups, (b) 0.01 to 30 parts by weight of at least one organoboron compound selected from the group consisting of tetraphenylborates of imidazole and tetraphenylborates of imidazole derivatives obtained by reacting alkali metal salts of tetraphenylboron with at least one member selected from the group consisting of salts of imidazole and salts of imidazole derivatives formed by reacting imidazole or imidazole derivatives represented by the general formula:

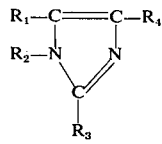

wherein $R_1$, $R_2$, $R_3$ and $R_4$, which may be the same as or different from one another, are selected from the group consisting of hydrogen, alkyl groups having 1 to 20 carbon atoms, alkenyl groups having 2 to 6 carbon atoms, acyl groups having 2 to 7 carbon atoms, aryl groups having 6 to 12 carbon atoms, cycloalkyl groups having 6 to 12 carbon atoms, cycloalkenyl groups having 6 to 12 carbon atoms, aldehyde group, carboxyl group, cyano group, and nitro group, with acids, and (c) 0.1 to 200 parts by weight of a curing agent selected from the group consisting of acid anhydrides and amine compounds.

4. An epoxy resin composition according to claim 3, wherein the amount of the at least one organoboron compound (b) is 0.01 to 20 parts by weight; the curing agent (c) is an acid anhydride and the amount of said acid anhydride is 0.1 to 200 parts by weight.

5. An epoxy resin composition according to claim 3, wherein the amount of the at least one organoboron compound (b) is 0.01 to 20 parts by weight; the curing agent (c) is an amine compound and the amount of said amine compound is 0.1 to 150 parts by weight.

6. An epoxy resin composition according to claim 1, wherein the organoboron compound (b) is at least one member selected from the group consisting of imidazolium tetraphenylborate, 2-ethyl-4-methylimidazolium tetraphenylborate, 1-cyanoethyl-2-phenylimidazolium tetraphenylborate, 1-cyanoethyl-2-undecylimidazolium tetraphenylborate, 1-cyanoethyl-2-ethyl-4-methylimidazolium tetraphenylborate, and 2-ethyl-1,4-dimethylimidazolium tetraphenylborate.

7. An epoxy resin composition according to claim 3, wherein the organoboron compound (b) is at least one tetraphenylborate selected from the group consisting of imidazolium tetraphenylborate, 2-ethyl-4-methylimidazolium tetraphenylborate, 1-cyanoethyl-2-phenylimidazolium tetraphenylborate, 1-cyanoethyl-2-undecylimidazolium tetraphenylborate, 1-cyanoethyl-2-ethyl-4-methylimidazolium tetraphenylborate, and 2-ethyl-1,4-dimethylimidazolium tetraphenylborate.

8. An epoxy resin composition according to claim 3, wherein the curing agent (c) is at least one member selected from the group consisting of maleic anhydride, dichloromaleic anhydride, dodecenylsuccinic anhydride, pyromellitic dianhydride, trimellitic anhydride, phthalic anhydride, tetrahydrophthalic anhydride, methyltetrahydrophthalic anhydride, hexahydrophthalic anhydride, endomethylenetetrahydrophthalic anhydride, methylendomethylenetetrahydrophthalic anhydride, hexachloroendomethylenetetrahydrophthalic anhydride, m-phenylenediamine, diaminodiphenyl ether, diaminodiphenylmethane, 4,4'-diaminodiphenylmethane-3,3'-dicarbonic acid, diaminodiphenyl sulfone, benzidine, 4,4'-bis(o-toluidine), 4,4'-thiodianiline, dianisidine, methylenebis(o-chloroaniline), bis(3,4-diaminophenyl) sulfone, and diaminoditolyl sulfone.

9. An epoxy resin composition according to claim 4, wherein the curing agent (c) is at least one acid anhydride selected from the group consisting of maleic anhydride, dichloromaleic anhydride, dodecenylsuccinic anhydride, pyromellitic dianhydride, trimellitic anhydride, phthalic anhydride, tetrahydrophthalic anhydride, methyltetrahydrophthalic anhydride, hexahydrophthalic anhydride, endomethylenetetrahydrophthalic anhydride, methylendomethylenetetrahydrophthalic anhydride, and hexachloroendomethylenetetrahydrophthalic anhydride.

10. An epoxy resin composition according to claim 5, wherein the curing agent (c) is at least one aromatic amine compound selected from the group consisting of m-phenylenediamine, diaminodiphenyl ether, diaminodiphenylmethane, 4,4'-diaminodiphenylmethane-3,3'-dicarbonic acid, diaminodiphenyl sulfone, benzidine, 4,4'-bis(o-toluidine), 4,4'-thiodianiline, dianisidine, methylene-bis(o-chloroaniline), bis(3,4-diaminophenyl) sulfone, and diaminoditolyl sulfone.

11. An epoxy resin composition comprising (a) 100 parts by weight of an epoxy resin having at least two vicinal epoxy groups, (b) 0.01 to 30 parts by weight of at least one organoboron compound selected from the group consisting of tetraphenyl borates of imidazole and tetraphenylborates of imidazole derivatives obtained by reacting alkali metal salts of tetraphenylboron with at least one member selected from the group consisting of salts of imidazole and salts of imidazole derivatives formed by reacting imidazole or imidazole derivatives represented by the general formula:

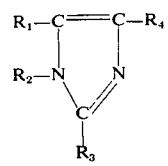

wherein $R_1$, $R_2$, $R_3$ and $R_4$, which may be the same as or different from one another, are selected from the group consisting of hydrogen, alkyl groups having 1 to 20 carbon atoms, alkenyl groups having 2 to 6 carbon atoms, acyl groups having 2 to 7 carbon atoms, aryl groups having 6 to 12 carbon atoms, cycloalkyl groups having 6 to 12 carbon atoms, cycloalkenyl groups having 6 to 12 carbon atoms, aldehyde group, carboxyl group, cyano group, and nitro group, with acids, and (d) 0.01 to 10 parts by weight of a curing catalyst for use in epoxy resins.

12. An epoxy resin composition according to claim 1, comprising at least one inorganic filler selected from the group consisting of glass, quartz glass, mica, calcium carbonate, calcium sulfate, barium sulfate, alumina, talc, clay, zirconium silicate (zircon), zirconium oxide, lithium aluminum silicate, beryl, aluminum silicate, beryllia, calcium silicate, and silica.

13. An epoxy resin composition according to claim 3, which further contains at least one inorganic filler selected from the group consisting of glass, quartz glass, mica, calcium carbonate, calcium sulfate, barium sulfate, alumina, talc, clay, zirconium silicate (zircon), zirconium oxide, lithium aluminum silicate, beryl, aluminum silicate, beryllia, calcium silicate, and silica.

14. A method for manufacturing an epoxy resin composition, which comprises bringing a mixture of starting materials into a softened or molten state by heating at 40° to 85°C. and subjecting the softened or molten mixture to a mixing treatment while applying a shearing force, said mixture of the starting materials comprising (a) 100 parts by weight of an epoxy resin having at least two vicinal epoxy groups, (b) 0.01 to 30 parts by weight of at least one organoboron compound selected from the group consisting of tetraphenylborates of imidazole and tetraphenylborates of imidazole derivatives obtained by reacting alkali metal salts of tetraphenylboron with at least one member selected from the group consisting of salts of imidazole and salts of imidazole derivatives formed by reacting imidazole or imidazole derivatives represented by the general formula:

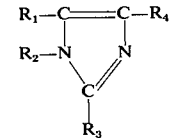

wherein $R_1$, $R_2$, $R_3$ and $R_4$, which may be the same as or different from one another, are selected from the group consisting of hydrogen, alkyl groups having 1 to 20 carbon atoms, alkenyl groups having 2 to 6 carbon atoms, acyl groups having 2 to 7 carbon atoms, aryl groups having 6 to 12 carbon atoms, cycloalkyl groups having 6 to 12 carbon atoms, cycloalkenyl groups having 6 to 12 carbon atoms, aldehyde group, carboxyl group, cyano group, and nitro group, with acids, and (c) 0.1 to 200 parts by weight of a curing agent selected from acid anhydrides and amine compounds.

15. A method for manufacturing an epoxy resin composition according to claim 14, wherein the epoxy resin (a) is a solid epoxy resin, the curing agent (c) is an amine compound, and the amount of said amine compound is 0.1 to 150 parts by weight.

16. A method for manufacturing an epoxy resin composition according to claim 14, wherein the mixing treatment is carried out by means of a mixing roll, a Ko-kneader-type extruder, a ribbon mixer, or an extruder.

17. A method for manufacturing an epoxy resin composition according to claim 14, wherein the epoxy resin (a), the organoboron compound (b), and the curing agent are compounded with an inorganic filler.

* * * * *